US012725893B2

(12) United States Patent
Kim et al.

(10) Patent No.: US 12,725,893 B2
(45) Date of Patent: Sep. 1, 2026

(54) BATTERY MODULE, BATTERY RACK COMPRISING SUCH BATTERY MODULE, AND POWER STORAGE DEVICE

(71) Applicant: LG ENERGY SOLUTION, LTD., Seoul (KR)

(72) Inventors: Se-Won Kim, Daejeon (KR); Jee-Soon Choi, Daejeon (KR); Sang-Jun Park, Daejeon (KR); Gyu-Jong Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 817 days.

(21) Appl. No.: 17/618,786

(22) PCT Filed: Jul. 8, 2020

(86) PCT No.: PCT/KR2020/008944
§ 371 (c)(1),
(2) Date: Dec. 13, 2021

(87) PCT Pub. No.: WO2021/006626
PCT Pub. Date: Jan. 14, 2021

(65) Prior Publication Data

US 2022/0247049 A1 Aug. 4, 2022

(30) Foreign Application Priority Data

Jul. 10, 2019 (KR) ........................ 10-2019-0083358

(51) Int. Cl.
*H01M 50/583* (2021.01)
*H01M 10/613* (2014.01)
*H01M 10/653* (2014.01)

(52) U.S. Cl.
CPC ....... *H01M 50/583* (2021.01); *H01M 10/613* (2015.04); *H01M 10/653* (2015.04); *H01M 2220/20* (2013.01)

(58) Field of Classification Search
None
See application file for complete search history.

(56) References Cited

U.S. PATENT DOCUMENTS

2007/0236177 A1* 10/2007 Phillips ............... H01M 50/227 429/82
2013/0049696 A1 2/2013 Zhu et al.
(Continued)

FOREIGN PATENT DOCUMENTS

CN 102859784 A 1/2013
CN 106099009 A * 11/2016
(Continued)

OTHER PUBLICATIONS

JP2014232566A_Machine translation (Year: 2014).*
(Continued)

*Primary Examiner* — Jonathan G Leong
*Assistant Examiner* — Aryana Y. Ortiz
(74) *Attorney, Agent, or Firm* — Birch, Stewart, Kolasch & Birch, LLP

(57) ABSTRACT

A battery module includes at least one battery cell, a module case configured to accommodate the at least one battery cell, a relay unit provided to the module case and electrically connected to the at least one battery cell, and a shunt unit electrically connected to the relay unit and provided to an outer side of the module case.

19 Claims, 5 Drawing Sheets

(56) References Cited

U.S. PATENT DOCUMENTS

| | | | | |
|---|---|---|---|---|
| 2013/0069594 | A1 | 3/2013 | Jung | |
| 2013/0302660 | A1 * | 11/2013 | Shiraishi | H01M 10/625 429/120 |
| 2014/0193685 | A1 | 7/2014 | Lim | |
| 2014/0315048 | A1 | 10/2014 | Yang | |
| 2017/0352933 | A1 | 12/2017 | Choi et al. | |
| 2018/0183031 | A1 * | 6/2018 | Nishikawa | H01G 11/76 |
| 2018/0198101 | A1 * | 7/2018 | Sheeks | H02J 7/007192 |
| 2018/0238970 | A1 * | 8/2018 | Gurtner | H01M 50/581 |
| 2019/0299799 | A1 | 10/2019 | Hinterberger et al. | |
| 2019/0379217 | A1 | 12/2019 | Song et al. | |
| 2019/0386350 | A1 | 12/2019 | Sato | |
| 2020/0028145 | A1 | 1/2020 | Kano et al. | |
| 2023/0020364 | A1 | 1/2023 | Blemberg et al. | |

FOREIGN PATENT DOCUMENTS

| | | | | |
|---|---|---|---|---|
| CN | 105957991 | B | 12/2018 | |
| CN | 109963738 | A | 7/2019 | |
| JP | 2005-285624 | A | 10/2005 | |
| JP | 2007-141511 | A | 6/2007 | |
| JP | 2011-222533 | A | 11/2011 | |
| JP | 3177989 | U | 8/2012 | |
| JP | 2014-33824 | A | 2/2014 | |
| JP | 2014-531703 | A | 11/2014 | |
| JP | 2014232566 | A * | 12/2014 | B60L 11/1864 |
| JP | 2016-126871 | A | 7/2016 | |
| JP | 6033207 | B2 | 11/2016 | |
| JP | 2018-148726 | A | 9/2018 | |
| KR | 1999-026944 | A | 4/1999 | |
| KR | 10-1177887 | B1 | 8/2012 | |
| KR | 10-2014-0125944 | A | 10/2014 | |
| KR | 10-2014-0143874 | A | 12/2014 | |
| KR | 10-1610925 | B1 | 4/2016 | |
| KR | 10-1730961 | B1 | 4/2017 | |
| KR | 10-1779157 | B1 | 9/2017 | |
| KR | 10-2019-0034888 | A | 4/2019 | |
| KR | 10-2019-0077550 | A | 7/2019 | |
| WO | WO2014/109041 | A1 | 7/2014 | |
| WO | WO 2018/129816 | A2 | 7/2018 | |
| WO | WO 2018/158955 | A1 | 9/2018 | |
| WO | WO-2018214263 | A1 * | 11/2018 | H02J 7/00 |

OTHER PUBLICATIONS

WO2018214263A1_Machine translation (Year: 2018).*
CN106099009A_Machine translation (Year: 2016).*
Indian Office Action for Indian Application No. 202217001283, dated Feb. 13, 2023, with English translation.
International Search Report for PCT/KR2020/008944 mailed on Oct. 28, 2020.
Extended European Search Report for corresponding European Application No. 20837264.9, dated Jun. 30, 2022.
Australian Office Action for Australian Application No. 2020311777, dated Mar. 27, 2025.

* cited by examiner

BATTERY MODULE, BATTERY RACK COMPRISING SUCH BATTERY MODULE, AND POWER STORAGE DEVICE

TECHNICAL FIELD

The present disclosure relates to a battery module, and a battery rack and an energy storage system including the battery module.

The present application claims priority to Korean Patent Application No. 10-2019-0083358 filed on Jul. 10, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack or a battery rack by using at least one battery module and adding other components. Here, by using the battery rack including at least one battery module, according to various voltage and capacity requirements, an energy storage system may be configured to include at least one battery rack.

In the case of a battery module used for a conventional energy storage system, a fire-fighting facility is provided to cope with risks such as fire caused by overheating that may occur due to the characteristics of the battery cell in the rack container that accommodates battery racks, each having a plurality of battery modules.

However, if fire starts inside the battery module, it is difficult to quickly extinguish the fire. If the fire is not quickly extinguished in the battery module or delayed to allow fire spreading, the fire may be transferred to surrounding battery modules more rapidly. Accordingly, there is a high possibility that the fire-fighting facility inside the rack container is operated later after damage is generated to the extent that it is difficult to recover.

Accordingly, if a fire situation occurs, a more rapid and early suppression is required, and in particular, a measure to prevent an accident in advance by detecting a danger before a fire occurs is necessary. For this purpose, it is necessary to extinguish the fire and prevent fire spreading inside the battery module.

Therefore, it is required to find a way to provide a battery module capable of more rapidly suppressing thermal runaway and heat propagation when an abnormal situation occurs in a battery cell, and a battery rack and an energy storage system including the battery module.

DISCLOSURE

Technical Problem

The present disclosure is directed to providing a battery module, which may more rapidly suppress thermal runaway and heat propagation when an abnormal situation occurs in a battery cell, and a battery pack and an energy storage system including the battery module.

Technical Solution

In one aspect of the present disclosure, there is provided a module, comprising: at least one battery cell; a module case configured to accommodate the at least one battery cell; a relay provided to the module case and electrically connected to the at least one battery cell; and a shunt electrically connected to the relay and provided to an outer side of the module case.

The battery module may further comprise a heatsink provided between the module case and the shunt.

The shunt and the heatsink may be provided at an upper side of the module case.

The shunt and the heatsink may be provided at a lower side of the module case.

The battery module may further comprise an insulation layer provided between the module case and the shunt.

The shunt and the insulation layer may be provided at an upper side of the module case.

The shunt and the insulation layer may be provided at a lower side of the module case.

In addition, the present disclosure further provides a battery rack, comprising: at least one battery module having a module case, at least one battery cell in the module case and a relay electrically connected to the at least one battery cell, a rack case configured to accommodate the at least one battery module and at least one shunt electrically connected to the at least one battery module.

The at least one shunt may be provided at an upper side of the rack case, and the battery rack may comprise an insulation layer provided between the rack case and the at least one shunt and mounted to an upper surface of the rack case.

Moreover, the present disclosure further provides an energy storage system, comprising at least one battery rack according to the above embodiments.

Advantageous Effects

According to various embodiments as above, it is possible to provide a battery module, which may more rapidly suppress thermal runaway and heat propagation when an abnormal situation occurs in a battery cell, and a battery pack and an energy storage system including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
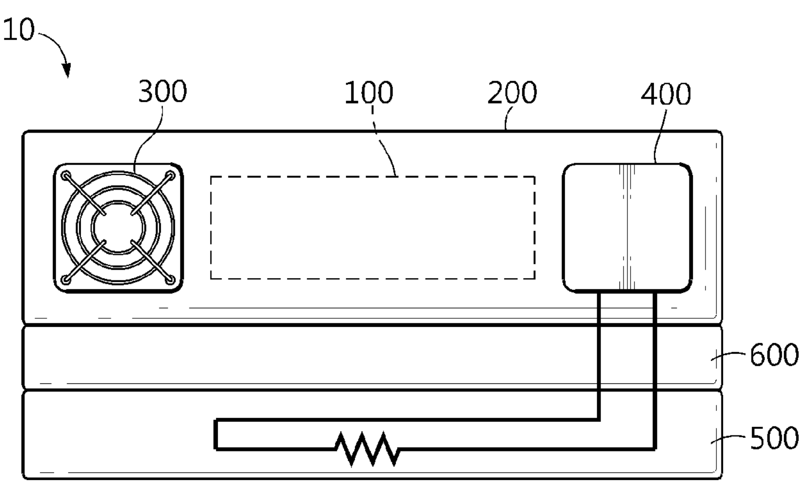
FIG. 1 is a diagram for illustrating a battery module according to an embodiment of the present disclosure.

FIG. 1 is a diagram for illustrating a battery module according to an embodiment of the present disclosure.

Referring to FIG. 1, a battery module 10 may include a battery cell 100, a module case 200, a cooling fan 300, a relay unit 400, a shunt unit 500, and a heatsink 600.

The battery cell 100 is a secondary battery and may be provided as a pouch-type secondary battery, a rectangular secondary battery or a cylindrical secondary battery. Hereinafter, in this embodiment, the battery cell 100 will be described as a pouch-type secondary battery.

At least one battery cell 100 a plurality of battery cells 100 may be provided. If a plurality of the battery cells 100 are provided, the plurality of battery cells 100 may be stacked to be electrically connected to each other.

The module case 200 may accommodate the at least one battery cell 100 or the plurality of battery cells 100. To this end, the module case 200 may have an accommodation space capable of accommodating the at least one battery cell 100 or the plurality of battery cells 100.

The cooling fan 300 is for cooling the at least one battery cell 100 or the plurality of battery cells 100, and may be mounted to the module case 200. The cooling fan 300 may be provided as a blower fan in an air-cooled manner.

The relay unit 400 is provided to the module case 200, and may be electrically connected to the at least one battery cell 100 or the plurality of battery cells 100. The relay unit 400 may be electrically connected to the shunt unit 500, explained later, to operate when an overcurrent occurs due to an abnormal condition of the at least one battery cell 100, so that the current of the battery cell 100 generated in the abnormal condition is induced to the shunt unit 500.

The shunt unit 500 is electrically connected to the relay unit 400, and may be provided to an outer side of the module case 200. Specifically, the shunt unit 500 may be disposed at a lower side of the module case 200 to be spaced apart from the module case 200 by a predetermined distance.

When the relay unit 400 connected to the battery cell 100 at which an abnormal condition occurs is operated, the shunt unit 500 may quickly externally short-circuit the battery cell 100 in which the abnormal condition has occurred from the outside.

The heatsink 600 may be provided between the module case 200 and the shunt unit 500. Specifically, the heatsink 600 may be provided between the module case 200 and the shunt unit 500 at a lower side of the module case 200.

The heatsink 600 may be provided in a water-cooled or air-cooled structure, and may minimize the transfer of heat generated from the shunt unit 500 toward the module case 200 during the external short circuit.

As such, by using the relay unit 400 and the shunt unit 500, if an abnormal situation occurs in at least one of the battery cells 100, the battery module 10 according to this embodiment may externally short-circuit the battery cell 100 at which the abnormal situation occurs more quickly at an outer side of the module case 200 to prevent a fire or explosion of the battery cell 100 at which the abnormal situation occurs in advance.

Moreover, the battery module 10 according to this embodiment may effectively prevent the risk of thermal runaway and heat propagation caused by the battery cell 100 at which an abnormal situation occurs, in the unit of the battery module 10, by means of the external short circuit through the relay unit 400 and the shunt unit 500.

Figure 2:
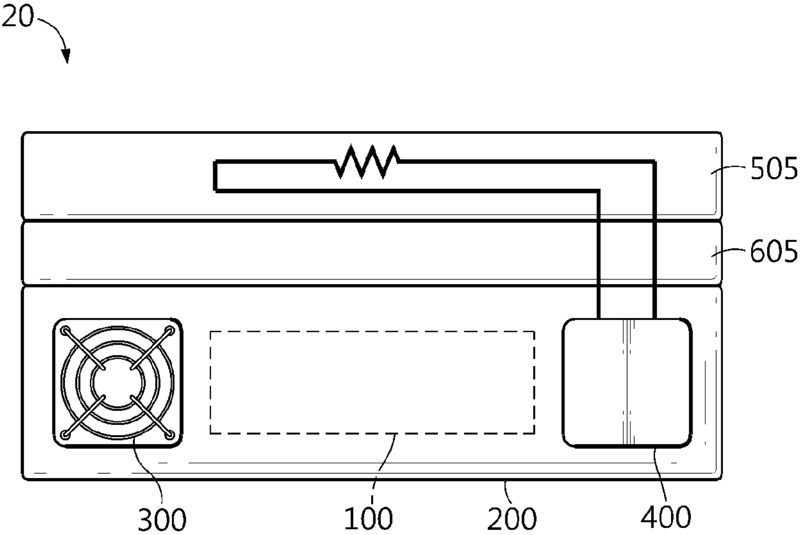
FIG. 2 is a diagram for illustrating a battery module according to another embodiment of the present disclosure.

FIG. 2 is a diagram for illustrating a battery module according to another embodiment of the present disclosure.

Since a battery module 20 of this embodiment is similar to the battery module 10 of the former embodiment, features substantially identical or similar to those of the former embodiment will not be described again, and hereinafter, features different from the former embodiment will be described in detail.

Referring to FIG. 2, a battery module 20 may include a battery cell 100, a module case 200, a cooling fan 300, a relay unit 400, a shunt unit 505, and a heatsink 605. The battery cell 100, the module case 200, the cooling fan 300 and the relay unit 400 are substantially identical or similar to those of the former embodiment, and thus will not described again below.

The shunt unit 505 and the heatsink 605 may be provided at an upper side of the module case 200. As such, the shunt unit 505 and the heatsink 605 may be provided at the upper side of the module case 200, rather than the lower side thereof, and the shunt unit 505 and the heatsink 605 may also be provided at a left or right side of the module case 200 as long as the shunt unit 505 may be separated from the module case 200 at the outer side of the module case 200.

Figure 3:
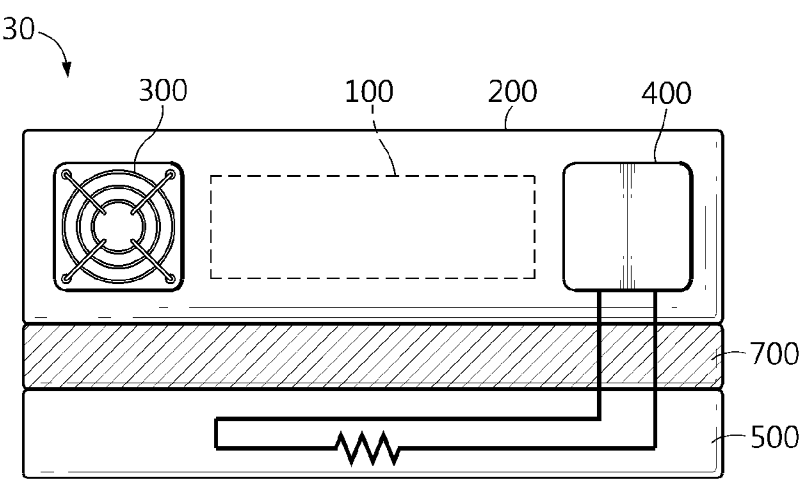
FIG. 3 is a diagram for illustrating a battery module according to still another embodiment of the present disclosure.

FIG. 3 is a diagram for illustrating a battery module according to still another embodiment of the present disclosure.

Since a battery module 30 of this embodiment is similar to the battery module 10 of the former embodiment, features substantially identical or similar to those of the former embodiment will not be described again, and hereinafter, features different from the former embodiment will be described in detail.

Referring to FIG. 3, the battery module 30 may include a battery cell 100, a module case 200, a cooling fan 300, a relay unit 400, a shunt unit 500, and an insulation unit 700. The battery cell 100, the module case 200, the cooling fan 300, the relay unit 400 and the shunt unit 500 are substantially identical or similar to those of the former embodiment, and thus will not described again below.

The insulation unit 700 may be provided between the module case 200 and the shunt unit 500. Specifically, the insulation unit 700 and the shunt unit 500 may be provided at a lower side of the module case 200, and the insulation unit 700 may separate the shunt unit 500 from the module case 200 by a predetermined distance at the lower side of the module case 200.

The insulation unit 700 may prevent the heat generated when an external short circuit occurs by the shunt unit 500 from being transferred to the module case 200. To this end, the insulation unit 700 may be made of a ceramic insulation material or a fiber insulation material.

As such, in this embodiment, by using the insulation unit 700 instead of the heatsink, heat it is possible to effectively prevent the heat from being transferred from the shunt unit 500 to the module case 200 during the external short circuit.

Figure 4:
FIG. 4 is a diagram for illustrating a battery module according to still another embodiment of the present disclosure.
Figure 4:
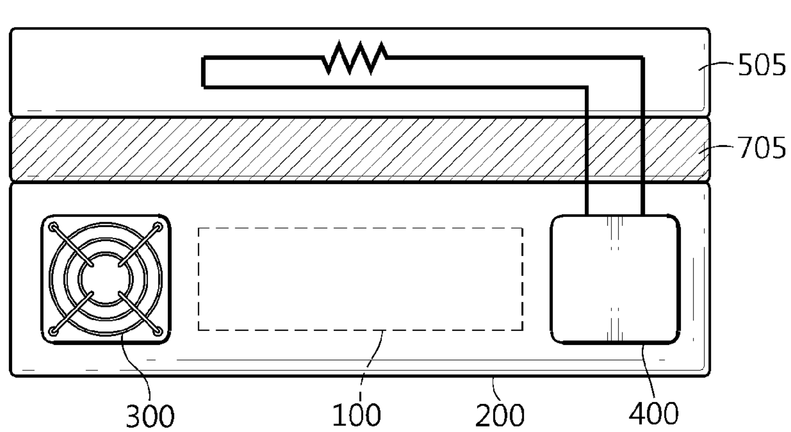

FIG. 4 is a diagram for illustrating a battery module according to still another embodiment of the present disclosure.

Since a battery module 40 of this embodiment is similar to the battery module 30 of the former embodiment, features substantially identical or similar to those of the former embodiment will not be described again, and hereinafter, features different from the former embodiment will be described in detail.

Referring to FIG. 4, the battery module 40 may include a battery cell 100, a module case 200, a cooling fan 300, a relay unit 400, a shunt unit 505, and an insulation unit 705.

The battery cell 100, the module case 200, the cooling fan 300 and the relay unit 400 are substantially identical or similar to those of the former embodiment, and thus will not described again below.

The shunt unit 505 and the insulation unit 705 may be provided at an upper side of the module case 200. As such, the shunt unit 505 and the insulation unit 705 may be provided at the upper side of the module case 200, rather than the lower side thereof, and the shunt unit 505 and the insulation unit 705 may also be provided at a left or right side of the module case 200 as long as the shunt unit 505 may be separated from the module case 200 at the outer side of the module case 200.

Figure 5:
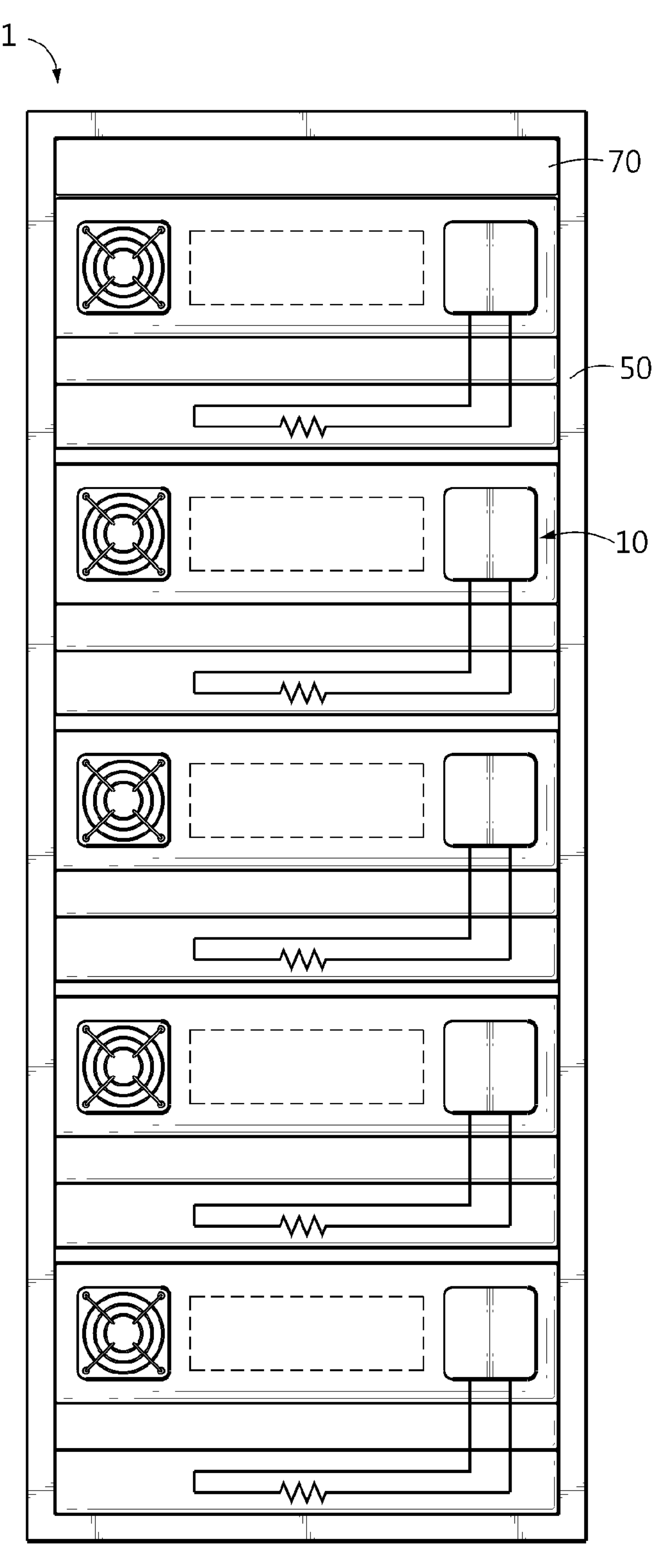
FIG. 5 is a diagram for illustrating a battery rack according to an embodiment of the present disclosure.

FIG. 5 is a diagram for illustrating a battery rack according to an embodiment of the present disclosure.

Referring to FIG. 5, a battery rack 1 may include at least one battery module 10 or a plurality of battery modules 10 of the former embodiment, a rack case 50 for accommodating the at least one battery module 10 or the plurality of battery modules 10, and a BMS unit 70 for managing and controlling the battery rack 10.

Since the battery rack 1 of this embodiment includes the battery module 10 of the former embodiment, the battery rack 1 may have all advantages of the battery module 10 of the former embodiment.

Meanwhile, the battery rack 10 may also include the battery modules 20, 30, 40 of the former embodiments, other than the battery module 10, and at this time, it is also possible to provide a battery rack 1 having all the advantages of the battery modules 20, 30, and 40 of the former embodiments.

Figure 6:
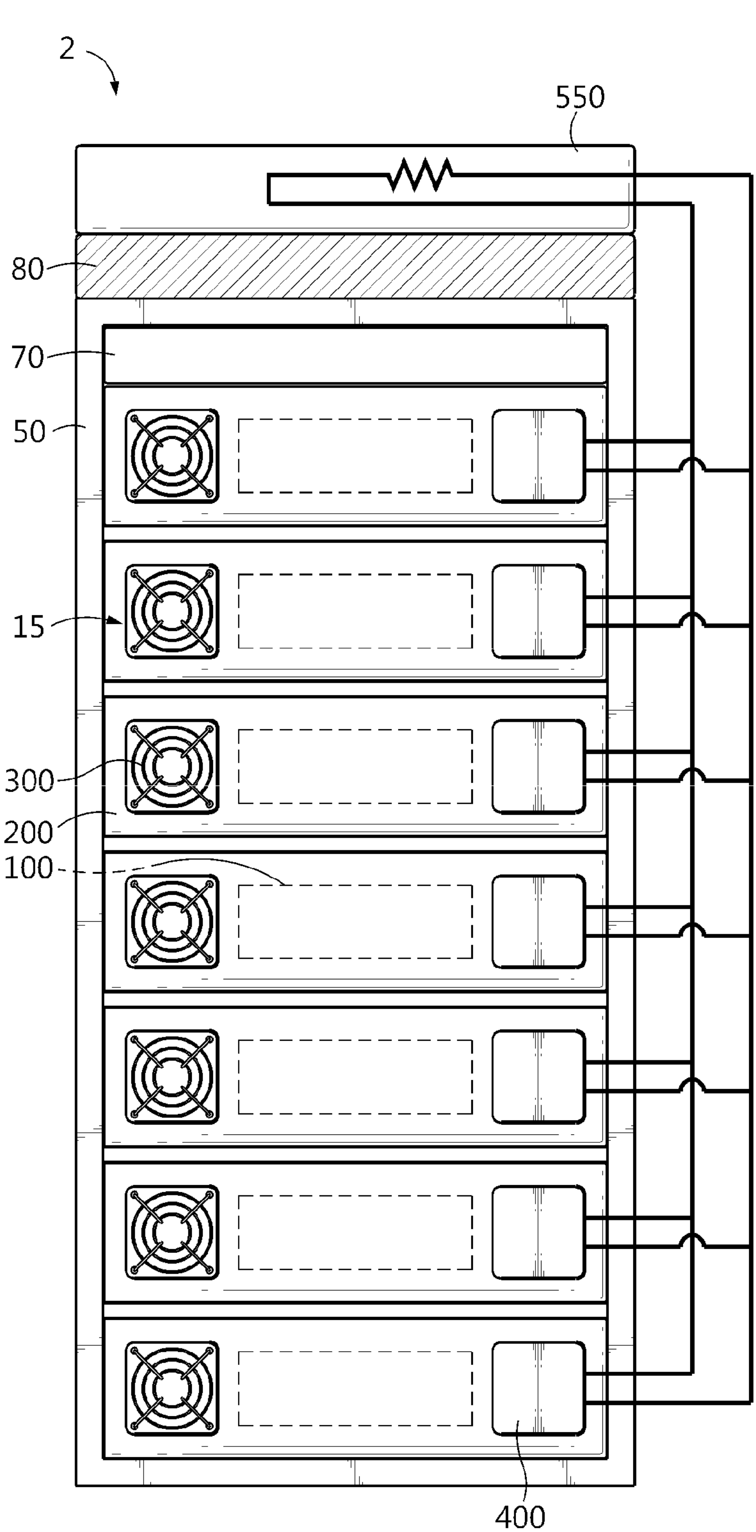
FIG. 6 is a diagram for illustrating a battery rack according to another embodiment of the present disclosure.

FIG. 6 is a diagram for illustrating a battery rack according to another embodiment of the present disclosure.

Since a battery rack 2 according to this embodiment is similar to the battery rack 1 of the former embodiment, features substantially identical or similar to those of the former embodiment will not be described again, and hereinafter, features different from the former embodiment will be described in detail.

Referring to FIG. 6, the battery rack 2 may include a plurality of battery modules 15, a rack case 50, a BMS unit 70, and an insulation unit 80.

Each of the plurality of battery modules 15 may include a battery cell 100, a module case 200, a cooling fan 300, and a relay unit 400. The battery cell 100, the module case 200, the cooling fan 300 and the relay unit 400 are substantially identical or similar to those of the former embodiment, and thus will not described again below.

Each of the plurality of battery modules 15 may include a battery cell 100, a module case 200, a cooling fan 300, and a relay unit 400. The battery cell 100, the module case 200, the cooling fan 300 and the relay unit 400 are substantially identical or similar to those of the former embodiment, and thus will not described again below.

Meanwhile, the plurality of battery modules 15 may include a shunt unit 550.

The shunt unit 550 is integrally connected to the relay units 400 of the plurality of battery modules 15, and may be disposed at an upper side of the rack case 50 to be spaced apart from the rack case 50.

The rack case 50 may accommodate the plurality of battery modules 15. In the rack case 50, the plurality of battery modules 15 may be stacked on each other in a vertical direction.

The BMS unit 70 is electrically connected to the plurality of battery modules 15, and may manage and control the battery rack 2. Specifically, the BMS unit 70 may be electrically connected to the battery cells 100 of the plurality of battery module 15 and the relay units 400 to control the operation or the like of the relay units 400 of the plurality of battery module 15.

The insulation unit 80 is provided between the rack case 50 and the shunt unit 550, and may be mounted to an upper surface of the rack case 50. The insulation unit 80 may effectively prevent the heat generated during the external short circuit by the shunt unit 550 from being transferred to the BMS unit 70.

Meanwhile, it may also be possible to prevent heat transfer from the shunt unit 550 to the BMS unit 70 through the heatsink of the former embodiment or a predetermined air gap, instead of the insulation unit 80.

In this embodiment, if overheating occurs due to an abnormal situation in at least one battery module 15 among the battery modules 15, the BMS unit 70 may operate the relay unit 400 of the battery module 15 at which the abnormal situation occurs to externally short-circuit the battery module 15 at which the abnormal situation occurs through the shunt unit 550.

As such, when an abnormal situation occurs in at least one battery module 15 among the battery modules 15, the battery rack 2 according to this embodiment may externally short-circuit only the battery module 15 at which the abnormal situation occurs, thereby minimizing the loss of the battery modules 15 when an abnormal situation occurs.

Moreover, since the battery rack 2 according to this embodiment includes only one shunt unit 550 in the unit of the battery rack 2, it is possible to reduce the manufacturing cost of the battery rack 2 and further simplify the entire system.

Figure 7:
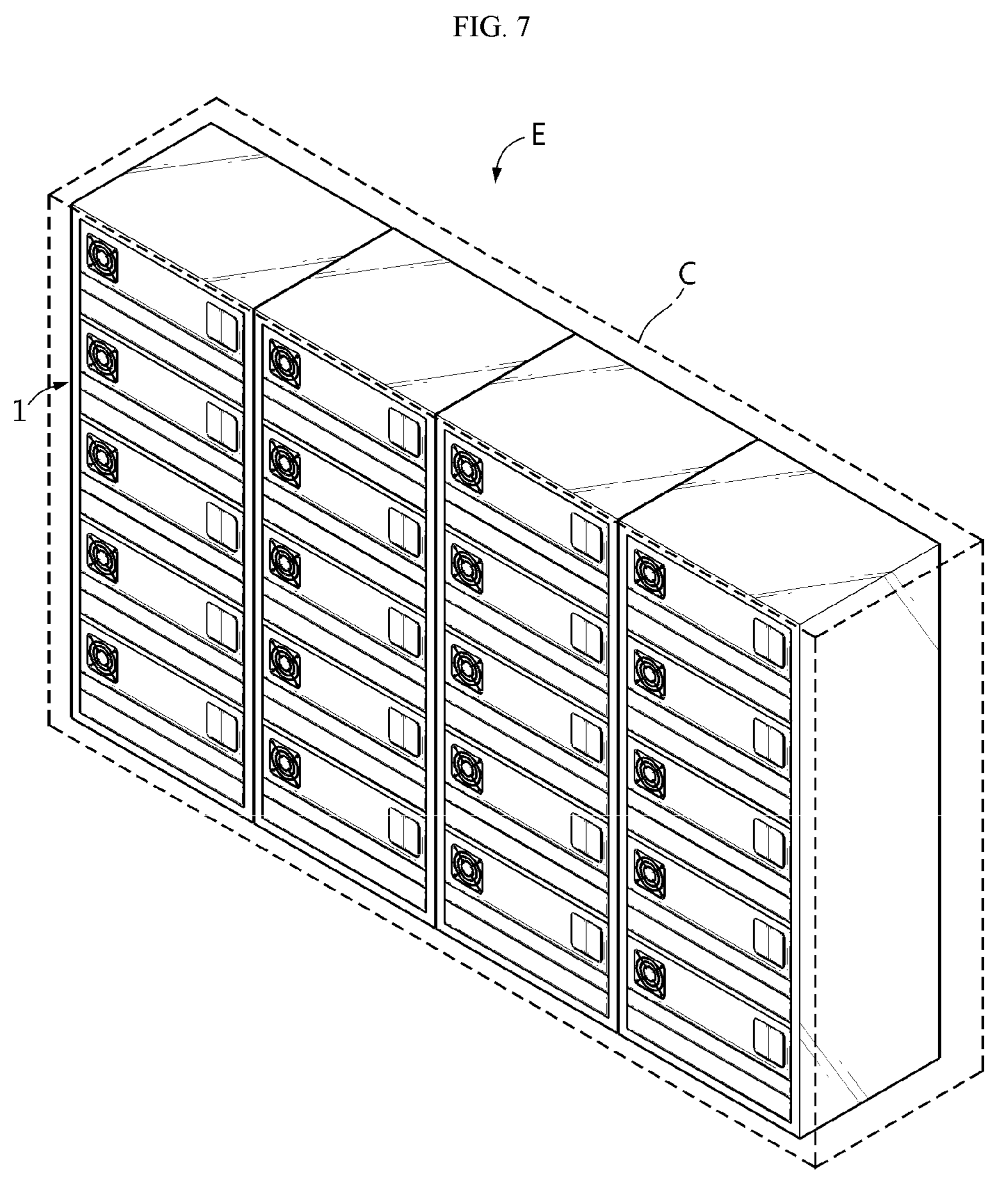
FIG. 7 is a diagram for illustrating an energy storage system according to an embodiment of the present disclosure.

FIG. 7 is a diagram for illustrating an energy storage system according to an embodiment of the present disclosure.

Referring to FIG. 7, an energy storage system E may be used for home or industries as an energy source. The energy storage system E may include at least one battery rack 1 of the former embodiment, or a plurality of battery racks 1 in this embodiment, and a rack container C for accommodating the plurality of battery racks 1.

Since the energy storage system E of this embodiment includes the battery rack 1 of the former embodiment, the energy storage system E may have all advantages of the battery rack 1 of the former embodiment.

Meanwhile, the battery rack 1 may be provided to a vehicle such as an electric vehicle or a hybrid electric vehicle, and in this case, it is possible to provide a vehicle having all the advantages of the battery rack 1 of the former embodiment.

Moreover, the battery rack 2 of the former embodiment other than the battery rack 1 may also be provided to the energy storage system E or the vehicle, and even in this case, it is possible to provide an energy storage system E or a vehicle having all the advantages of the battery rack 2 of the former embodiment.

According to various embodiments as above, it is possible to provide the battery module 10, 15, 20, 30, 40, which may more rapidly suppress thermal runaway and heat propagation when an abnormal situation occurs in the battery cell 100, and the battery pack 1, 2 and the energy storage system E including the battery module 10, 15, 20, 30, 40.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:

at least one battery cell;

a module case configured to accommodate the at least one battery cell;

a relay provided to the module case and electrically connected to the at least one battery cell;

a shunt directly electrically connected to the relay and provided to an outer side of the module case, the shunt having a housing; and a heatsink provided in a water-cooled or air-cooled structure, the heatsink being provided between the module case and the shunt to minimize transfer of heat generated from the shunt toward the module case during an external short circuit, wherein a width of the housing of the shunt is equal to a width of an outer side of the module case.

2. The battery module according to claim 1, wherein the shunt and the heatsink are provided at an upper side of the module case.

3. The battery module according to claim 1, wherein the shunt and the heatsink are provided at a lower side of the module case.

4. The battery module according to claim 1, further comprising:

an insulation layer provided between the module case and the shunt.

5. The battery module according to claim 4, wherein the shunt and the insulation layer are provided at an upper side of the module case.

6. The battery module according to claim 4, wherein the shunt and the insulation layer are provided at a lower side of the module case.

7. The battery module according to claim 4, wherein the shunt is spaced apart from the module case by a predetermined distance by the insulation layer.

8. The battery module according to claim 1, further comprising a battery module system connected to the relay to short circuit the at least one battery cell through the shunt.

9. The battery module according to claim 1, wherein the relay is between the shunt and the at least one battery cell.

10. The battery module according to claim 1, wherein the shunt is spaced apart from the module case by a predetermined distance by the heatsink.

11. The battery module according to claim 1, further comprising a fan in a rear surface of the module case.

12. The battery module according to claim 1, wherein the relay is attached to a rear surface of the module case.

13. The battery module according to claim 1, wherein a width of the heatsink is equal to the width of the outer side of the module case.

14. A battery rack, comprising:

at least one battery module having a module case, at least one battery cell in the module case and a relay electrically connected to the at least one battery cell;

a rack case configured to accommodate the at least one battery module;

at least one shunt directly electrically connected to the at least one battery module, the at least one shunt having a housing; and a heatsink provided in a water-cooled or air-cooled structure, the heatsink being provided between the module case and the shunt to minimize the transfer of heat generated from the shunt toward the module case during an external short circuit, wherein a width of the housing of the at least one shunt is equal to a width of an outer side of the module case.

15. The battery rack according to claim 14, wherein the at least one shunt is provided at an upper side of the rack case, and the battery rack comprises an insulation layer provided between the rack case and the at least one shunt and mounted to an upper surface of the rack case.

16. The battery rack according to claim 14, wherein the at least one battery module is a plurality of battery modules forming a module stack, and wherein the at least one shunt is electrically connected to each of the plurality of battery modules.

17. The battery rack according to claim 16, further comprising an insulator layer between the at least one battery module and the at least one shunt.

18. The battery rack according to claim 14, wherein the at least one module case is a plurality of module cases forming a module stack, wherein the at least one shunt is a plurality of shunts, and wherein each of the plurality of shunts is electrically connected to a respective one of the plurality of module cases.

19. An energy storage system, comprising:

at least one battery rack as defined in claim 14.

* * * * *